Patented May 14, 1940

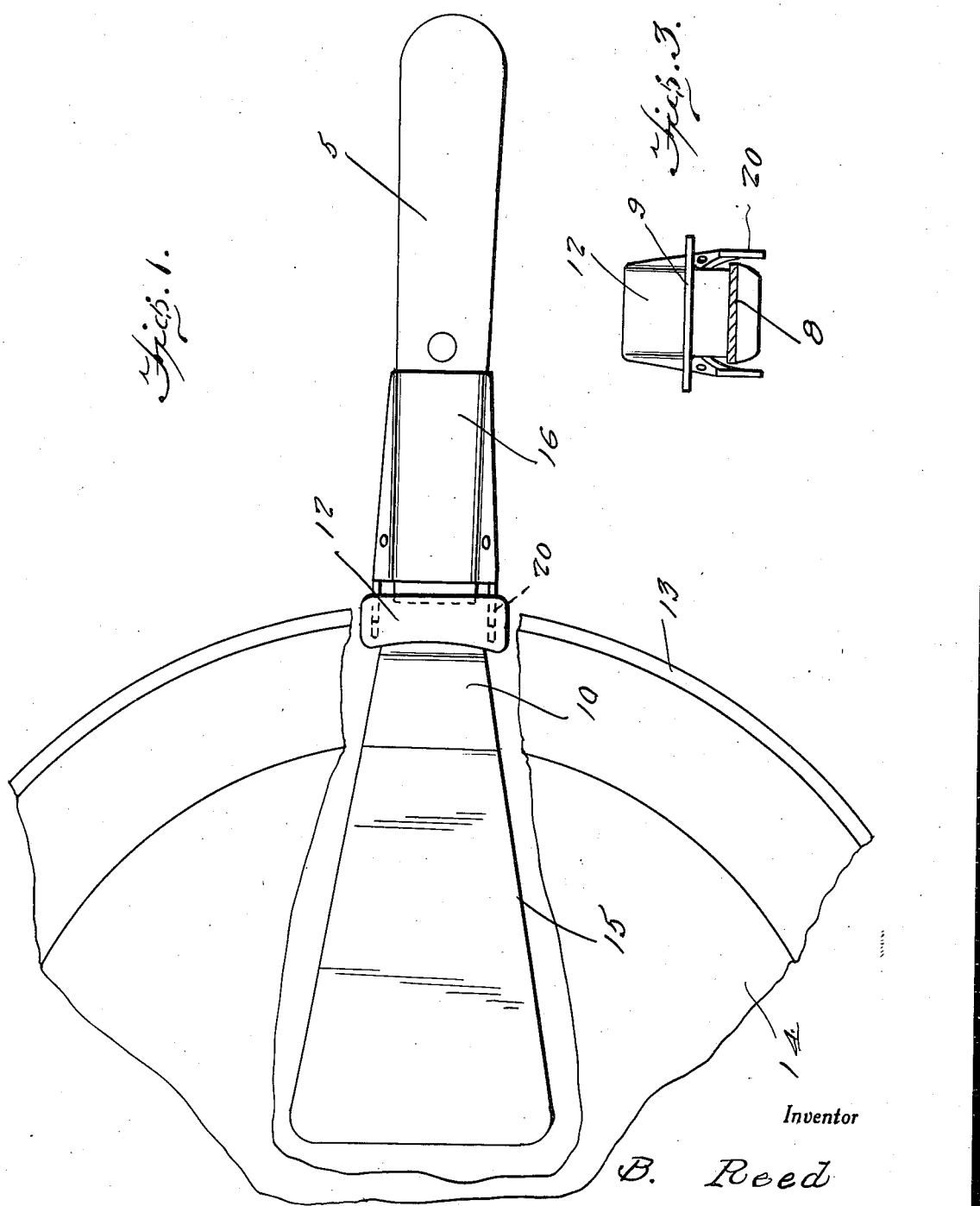

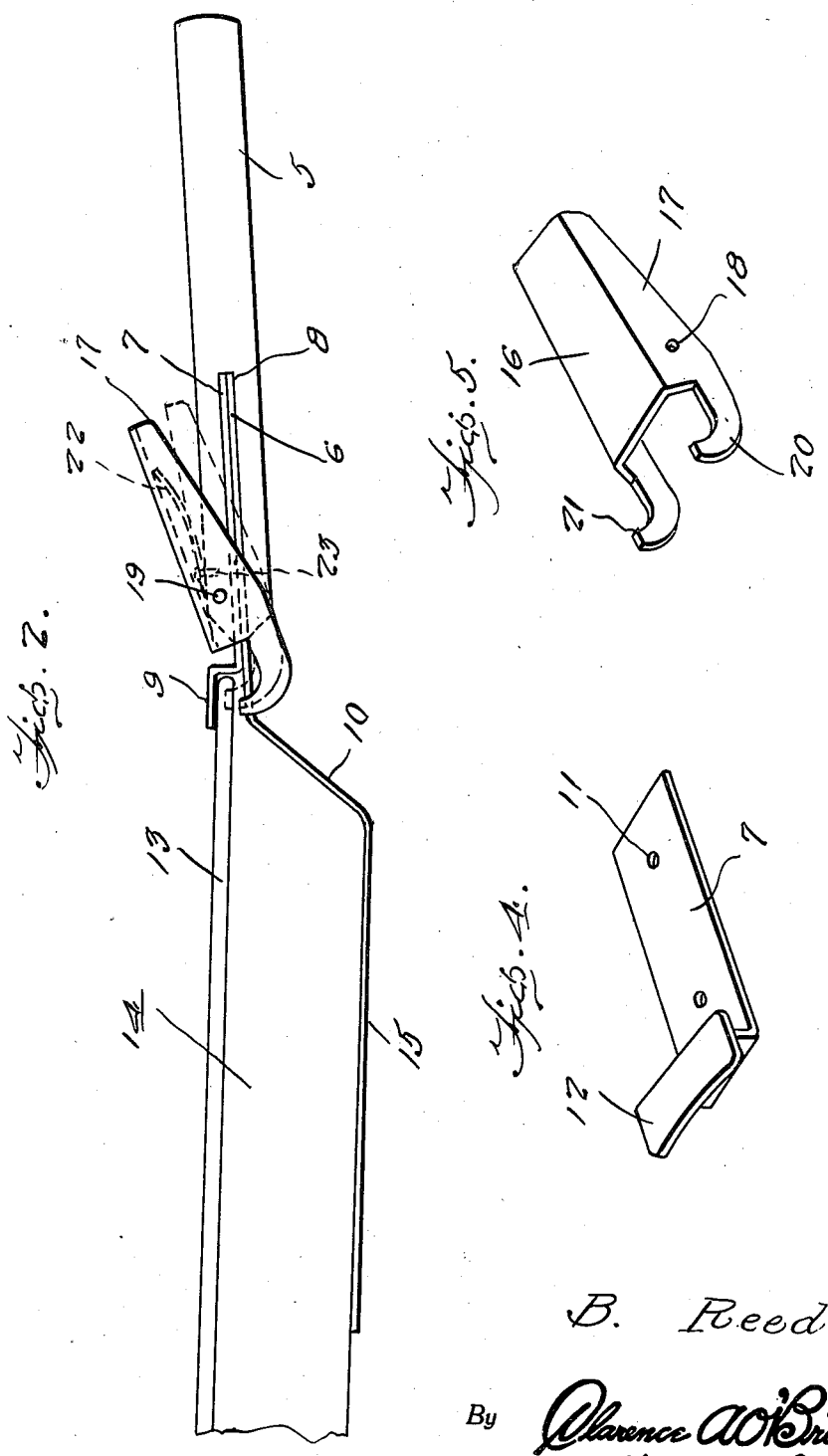

2,200,432

UNITED STATES PATENT OFFICE 2,200,432

PAN LIFTER

Bert Reed, Moorhead, Minn.

Application March 28, 1939, Serial No. 264,636

3 Claims. (Cl. 294—29)

The present invention relates to pan lifting devices and has for its primary object to provide a handle embodying clamping means for clamping engagement with the rim of a pie pan or similar cooking utensil whereby to provide means for conveniently handling the same.

A further object is to provide an article of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view.

Figure 2 is a side elevational view.

Figure 3 is a transverse sectional view.

Figure 4 is a perspective view of the angular bracket adapted for engaging the top of the rim of the pie pan, and Figure 5 is a perspective view of the pivoted clamping member for engaging the under side of the rim.

Referring now to the drawings in detail, wherein for the purpose of illustration I have disclosed a preferred embodiment of the invention, the numeral 5 designates a handle, preferably of wood, the inner end of the handle being split or bifurcated as indicated at 6 for receiving the end portions 7 and 8 of the clamping arms designated generally at 9 and 10. The end portions 7 and 8 of the clamping members are provided with openings 11 for accommodating screws, rivets or the like (not shown) for attaching the plates in position to the handle.

The outwardly projecting end portion of the clamping member 9 is formed with a laterally off-set clamping plate 12 adapted to engage the upper surface of the rim 13 of a pie pan 14, or the like, while the outwardly projecting end portion of the clamping member 10 is formed with a relatively broad blade 15 which is off-set from the plane of its attached end 8 and in a direction oppositely from the off-set plate 12 and adapted to underlie the bottom of the pie pan as more clearly shown in Figure 2 of the drawings.

A pivoted clamping member 16 is provided which is of U-shaped formation in cross section and including a pair of parallel spaced side members 17 adapted for positioning at opposite sides of the handle 5 and provided with an opening 18 for receiving a pivot pin 19 to pivotally attach the clamping member to the handle. One end of the clamping member 16 is formed with a pair of spaced parallel jaws 20 having their extremities curved upwardly as shown at 21 and adapted to engage the under side of the rim portion 13 of the pie pan in clamping cooperation with respect to the off-set plate 12.

At the under side of the clamping member 16 is arranged a leaf spring 22 having one end secured to the handle by a pin 23 and having its opposite end extending rearwardly and engaging the under side of the clamping member to yieldably urge the same in an upwardly extended position as shown by the full lines in Figure 2 of the drawings, with the upturned ends 21 disengaged from the rear of the pie pan.

In the operation of the device after the clamping members 9 and 10 have been placed in position with respect to the pie pan, as shown in Figure 2, the rear end of the pivoted clamping member 16 is depressed against the tension of the spring 22, thereby causing the hooked ends 21 to firmly engage the under side of the rim 13 and thus enable the handle to be used in lifting the pan as desired.

It is believed the details of construction and manner of use of the device will be readily understood from the foregoing without further detailed explanation.

Having thus described the invention, what I claim is:

1. A pie pan lifter comprising a handle, a pair of gripping members each having one end in flatwise engagement with the other and fitted in the handle, the other ends of the members projecting outwardly from the handle, one of said members extending under the bottom of the pan to be lifted and the other member bearing against the top of the rim of the pan and a pivoted clamping member carried by the handle and engageable with the under side of the rim for cooperation with said other member in clamping the rim therebetween.

2. A pie pan lifter comprising a handle, a pair of gripping members each having one end in flatwise engagement with the other and fitted in the handle, the other ends of the members projecting outwardly from the handle, one of said members extending under the bottom of the pan to be lifted and the other member bearing against the top of the rim of the pan, a clamping member pivoted to the handle and extending longitudinally above the same and a pair of spaced clamping jaws carried by said clamping member and adapted for movement into engagement with the bottom of the rim and cooperating with said other member to clamp the rim therebetween.

3. A pie pan lifter comprising a handle, a pair of gripping members each having one end in flatwise engagement with the other and fitted in the handle, the other ends of the members projecting outwardly from the handle, one of said members extending under the bottom of the pan to be lifted and the other member at its outer end having a horizontally offset extending head bearing against the top of the rim of the pan, a clamping member pivoted to the handle and extending longitudinally above the same and a pair of spaced forwardly extending clamping jaws carried by said clamping member and curved upwardly at opposite sides of the gripping members and adapted for movement into engagement with the bottom of the rim and cooperating with said other member to clamp the rim therebetween.

BERT REED.